US008563074B2

(12) United States Patent
De Brouwer et al.

(10) Patent No.: US 8,563,074 B2
(45) Date of Patent: Oct. 22, 2013

(54) CONFECTIONERY COMPOSITIONS

(75) Inventors: Marijke De Brouwer, Lebbeke-Wieze (BE); Alex Landuyt, Lebbeke-Wieze (BE); Maurice De Vis, Lebbeke-Wieze (BE)

(73) Assignee: Barry Callebaut AG, Zurich (CH)

( * ) Notice: Subject to any disclaimer, the term of this patent is extended or adjusted under 35 U.S.C. 154(b) by 749 days.

(21) Appl. No.: 12/095,170

(22) PCT Filed: Nov. 28, 2006

(86) PCT No.: PCT/CH2006/000667
§ 371 (c)(1),
(2), (4) Date: Sep. 9, 2008

(87) PCT Pub. No.: WO2007/059644
PCT Pub. Date: May 31, 2007

(65) Prior Publication Data
US 2009/0017184 A1  Jan. 15, 2009

(30) Foreign Application Priority Data
Nov. 28, 2005 (GB) .................................. 0524128.6

(51) Int. Cl.
*A23G 3/00* (2006.01)

(52) U.S. Cl.
USPC ............ 426/660; 426/548; 426/558; 426/584

(58) Field of Classification Search
USPC ....................................................... 426/660
See application file for complete search history.

(56) References Cited

U.S. PATENT DOCUMENTS

| | | | | |
|---|---|---|---|---|
| 4,911,937 A | * | 3/1990 | Crosello et al. | ............... 426/103 |
| 4,980,189 A | | 12/1990 | Keme et al. | |
| 5,017,400 A | * | 5/1991 | Olinger et al. | ................. 426/660 |
| 5,286,501 A | * | 2/1994 | Song et al. | ......................... 426/3 |
| 5,360,621 A | | 11/1994 | Metink et al. | |
| 5,419,925 A | | 5/1995 | Seiden et al. | |
| 5,425,957 A | | 6/1995 | Gaim-Marsoner et al. | |
| 5,490,996 A | | 2/1996 | Desplant et al. | |
| 5,527,556 A | | 6/1996 | Frippiat et al. | |
| 5,629,040 A | | 5/1997 | Takemori et al. | |
| 5,711,982 A | | 1/1998 | Takemori et al. | |
| 5,753,296 A | | 5/1998 | Girsh | |
| 5,976,605 A | | 11/1999 | Van Der Schueren et al. | |
| 6,071,548 A | | 6/2000 | Hilhorst et al. | |
| 6,143,345 A | | 11/2000 | Gonze et al. | |
| 6,221,422 B1 | * | 4/2001 | Kruger et al. | ................. 426/631 |
| 6,423,358 B1 | | 7/2002 | Barndt et al. | |
| 6,432,460 B1 | * | 8/2002 | Zietlow et al. | ................... 426/74 |
| 6,436,453 B1 | * | 8/2002 | van Lengerich et al. | ....... 426/74 |
| 6,767,576 B2 | | 7/2004 | Serpelloni | |
| 6,841,186 B2 | | 1/2005 | Davila et al. | |
| 2002/0192344 A1 | | 12/2002 | Brendel et al. | |
| 2004/0086615 A1 | * | 5/2004 | Johnson et al. | ............... 426/548 |
| 2005/0118311 A1 | | 6/2005 | Best et al. | |
| 2006/0008576 A1 | * | 1/2006 | Buck et al. | .................... 426/660 |
| 2006/0025584 A1 | | 2/2006 | Eroma et al. | |
| 2006/0034975 A1 | | 2/2006 | Schechner et al. | |
| 2006/0088637 A1 | | 4/2006 | Goldman | |

FOREIGN PATENT DOCUMENTS

| | | |
|---|---|---|
| EP | 0674840 | 3/1995 |
| EP | 0788744 | 8/1997 |
| EP | 0821885 | 2/1998 |
| EP | 1125507 | 8/2001 |
| EP | 1652436 | 5/2006 |
| JP | 1994-0222783 | 2/1994 |
| JP | 1994-062745 | 3/1994 |
| JP | 1995-079704 | 3/1995 |
| WO | WO93/02566 | 2/1993 |
| WO | WO 93/06744 | 4/1993 |
| WO | WO 95/10946 | 4/1995 |
| WO | WO98/04156 | 2/1998 |
| WO | WO 98/38223 | 9/1998 |
| WO | WO 98/42206 | 10/1998 |
| WO | WO02/094037 | 11/2002 |
| WO | WO 2004/112505 | 12/2004 |
| WO | WO2006/015880 | 2/2006 |
| WO | WO 2006/047151 | 5/2006 |

OTHER PUBLICATIONS

U.S. Appl. No. 60/587,131, filed Jul. 2004, Buck et al.*
De Baets: Functional Sugar Replacement; Priority Dec. 8, 2004; PCT/EP05/008810 has priority of EP 04103889.4, however citations and reference provided is of the related PCT.*
De Soete: Reduced Calorie Chocolate Confectionery Compositions; WO1993002566; Jul. 8, 1991.*
Rudy Wouters; The use of inulin as fat replacer in dair products and table spreads; Conference 'Novedades sobre Aceites Y Grassas' organized by the Association of Chemists of the Institute Quimic de Sarria (IQS) on Aug. 3, 2000 in Barcelona.
P.Coussement; Multi-functionele inuline; Flanders Food Magazine 13; pp. 23-26, (1998).
P.Coussement; Multi-funtional inulin; Food Ingredients and Analysis International; pp. 8-10, (Oct. 1997).
Souci et al; Nutrition Tables 1986/87, p. 36; $3^{rd}$ revised and completed edition; Wissenschaftliche Verlagsgesellschaft mbH Stuttgart, 1986; ISBN 3-8047-0833-1.
Souci et al; Nutrition Tables 1986/87, p. 40; $3^{rd}$ revised and completed edition; Wissenschaftliche Verlagsgesellschaft mbH Stuttgart, 1986; ISBN 3-8047-0833-1.

* cited by examiner

*Primary Examiner* — Humera Sheikh
*Assistant Examiner* — Patricia George
(74) *Attorney, Agent, or Firm* — Hoxie & Associates LLC

(57) ABSTRACT

A chocolate composition wherein at least 30% by weight, e.g. 33 to 40% or more, of the sucrose content of regular chocolate is replaced by a combination of dietary fibres and wherein the fibre combination comprises, consists of or consists essentially of a dextrin, an inulin and an oligofructose.

1 Claim, No Drawings

CONFECTIONERY COMPOSITIONS

CROSS REFERENCE TO RELATED APPLICATIONS

This application is a United States Application under 35 USC §371 claiming benefit of PCT Application No. PCT/CH2006/000667, filed on Nov. 28, 2006, which claims the benefit of Great Britain Application No. 0524128.6 filed on Nov. 28, 2005, the contents of each of which are incorporated herein by reference.

This invention relates to reduced sugar confectionery compositions, in particular chocolate compositions having a reduced sucrose content.

Regular chocolate compositions typically contain around 35 to 50% by weight sucrose.

Published PCT application WO 93/02566 describes reduced calorie chocolate compositions in which the sugar is wholly or partially replaced by inulin, branched inulin, linear or branched fructo-oligosaccharides or a mixture thereof, and optionally a high-intensity sweetener.

U.S. Pat. No. 5,711,982 describes compositions containing milk powders. Chocolate compositions containing either inulin or indigestible dextrin were found to be unacceptable.

The present applicants have found that known reduced sugar chocolate compositions suffer from a number of deficiencies, including poor mouthfeel and taste profile, difficult processability, and poor colonic and intestinal tolerance.

The present applicants have sought to overcome the drawbacks of hitherto known reduced sugar chocolate compositions.

In one aspect, therefore, this invention provides a confectionery, e.g. chocolate, composition wherein at least 30% by weight, e.g. 33 to 40% or more, of the sucrose content of regular chocolate is replaced by a combination of dietary fibres which dietary fibre combination comprises, consists of or consists essentially of a dextrin, an inulin and an oligofructose.

In another aspect, the combination of dietary fibres may comprise or consist essentially of
  a dextrin and
  an oligofructose as predominantly short-chain fibre component.

The compositions of this invention may therefore contain sucrose in an amount of up to approximately 30% by weight, e.g. 15 to 30%, e.g. 20 to 29%, e.g. 24 to 26% by weight based on the total weight of the composition.

The dextrin may be present in an amount between 1 to 18% by weight based on the total weight of the composition, e.g. 3 to 14%, e.g. 6 to 10%.

The dextrin is preferably long-chain, e.g. a complex long-chain dietary fibre, and may be straight-chain, branched-chain or a mixture. Dextrins suitable for the compositions of this invention include corn dextrin, malt dextrin, oat dextrin and wheat dextrin. Corn dextrin is preferred.

In one embodiment, the dextrin is partially digestible.

Suitable corn dextrins are commercially available under the trademark Nutriose, e.g. Nutriose FM 10, from the Roquette company.

In one embodiment, the inulin and oligofructose are premixed and used as a mixture. When present as a mixture, the oligofructose inulin mixture is present in an amount of 1 to 17%, e.g. 4 to 13%, e.g. 6 to 11% by weight, based on the weight of the composition.

The oligofructose inulin mixture may comprise 10 to 90% by weight, e.g. 20 to 80%, short-chain fibres and 90 to 10% by weight, e.g. 80 to 20%, long-chain fibres. The oligofructose inulin mixture comprises linear chains of fructose units linked by β (2-1) bonds and may comprise terminal glucose units. In one embodiment, the oligofructose inulin mixture comprises inulin with a degree of polymerisation (DP) greater than 10 and oligofructose with an average degree of polymerisation (DP) between 2 and 7.

The applicants understand "long-chain" to indicate a DP of 20 or more. "Short-chain" is understood to mean a DP of 4.

A suitable oligofructose inulin mixture is available commercially under the trademark Raftilose Synergy1 from the Orafti company.

The compositions of this invention may comprise a predominantly short-chain or low DP fibre component as oligofructose such as that available commercially under the trademark Actilight, e.g. Actilight 950P, from the Beghin Meiji company. When present, the short-chain or low DP fibre component is present in an amount of 1 to 17%, e.g. 4 to 13%, e.g. 6 to 11% by weight.

The weight ratio of fibre component, e.g. the oligofructose inulin mixture, or the predominantly short-chain fibre component, to dextrin may be 1:2 to 2:1, e.g. 1:1.5 to 1.5:1, e.g. 1:1.2 to 1.2:1 such as 1:1.15 to 1.15 to 1, e.g. 1.1:1 to 1:1.1.

When an inulin/oligofructose mixture is used in the compositions of this invention, the weight ratio of inulin to oligofructose may be between 1:5 to 5:1, for example 1:4, 1:3, 1:2, 1:1, 2:1, 3:1, or 4:1.

The total amount of dextrin and oligofructose inulin mixture or dextrin and predominantly short-chain oligofructose fibres may comprise between 2% and 35% by weight based on the total weight of the composition, for example 8 to 25%, for example 10 to 20% by weight, e.g. 12%, 13%, 14%, 15%, 16%, 17%, 18% or 19%.

The dextrin, inulin and oligofructose components used in the compositions of this invention may be respectively in amorphous or crystalline form.

The compositions of this invention comprise constituents typically used in chocolate. Thus, in addition to the sucrose and dietary fibre components, the following constituents may be present, in weight % based on the total weight of the composition:

Cocoa butter: between 15 and 30% by weight.

Full cream milk powder (FCMP) or a combination of skimmed milkpowder and anhydrous milkfat: when present, between 2 and 30% by weight, e.g. 20 to 25%.

Cocoa liquor: between 5 and 60% by weight, e.g. 10 to 45%.

Emulsifier: the applicants have found that suitable emulsifiers include lecithin, fractionated lecithin, ammonium phosphatide (AMF), castor oil lipids or polyglycerol polyricinoleate (PGPR), or a mixture of two or more of these. The emulsifier may be present in an amount of up to 1%, e.g. 0.5 to 0.7% based on the total weight of the composition. Lecithin, if used, may be present in form of a salt, e.g. phosphate.

If present, preferred emulsifiers are lecithin phosphate or a mixture of AMF with PGPR. An AMF/PGPR mixture using a weight ratio of 1:3 to 3:1, such as 1:2 to 2:1, e.g. 1:1, permits an improved yield. Less cocoa butter is required in order to obtain a satisfactory rheology.

Vanillin: 0.01 to 0.1%, e.g. 0.02 to 0.05%.

In a preferred aspect, the compositions of this invention are free of artificial sweetener, e.g. intensive artificial sweetener.

Water-content is generally below 2% by weight, e.g. less than 1% by weight based on the total weight of the composition.

Following is a description by way of example only of chocolate compositions of this invention.

Four separate 1000 kg batches are prepared, using composition recipes 1A, 1B, 2A and 2B respectively. Comparative examples are shown under 3 with Table 1, and 4 with Table 2.

Full cream milk powder is abbreviated to FCMP.

1A Milk Chocolate

|  | % weight |
| --- | --- |
| Sucrose | 25.0 |
| Cocoa butter | 23.8 |
| FCMP spray | 22.50 |
| Cocoa liquor | 11.3 |
| Actilight fibres | 9.0 |
| (Dietary fibre: Actilight P95 oligofructose) | |
| Nutriose FM10 corn dextrin | 7.8 |
| Lecithin phosphate | 0.57 |
| Vanillin ex-lignin | 0.03 |
| | 100 |

A 1000 kg batch is prepared using recipe 1A. The mixing and refining steps are followed by conching. Conching takes place at 70° C. A total cycle time of 9 hours is employed as follows:

| conche filling | 3 hours |
| --- | --- |
| dry conching | 4.5 hrs |
| finishing | 0.5 hr |
| pumping | 1 hr |
| total cycle time | 9 hrs. |

The vanillin is added in the finishing tank.

1B Dark Chocolate

|  | % weight |
| --- | --- |
| Sucrose | 29.2 |
| Cocoa butter | 11.7 |
| FCMP spray | — |
| Cocoa liquor | 43.8 |
| Actilight fibres | 8.8 |
| (Dietary fibre: Actilight P95 oligofructose) | |
| Nutriose FM10 corn dextrin | 5.8 |
| Lecithin phosphate | 0.68 |
| Vanillin ex-lignin | 0.02 |
| | 100 |

A 1000 kg batch is prepared using recipe 1B. Processing, including conching, is performed in analogous manner to that of 1A using a somewhat higher conching temperature of approx. 100° C.

2A Milk Chocolate

|  | % weight |
| --- | --- |
| Sucrose | 25.0 |
| Cocoa butter | 23.8 |
| FCMP spray | 22.5 |
| Cocoa liquor | 11.3 |
| Dietary fibre | 9.0 |
| (Raftilose Synergy 1 as oligofructose/inulin mixture) | |
| Dietary fibre | 7.8 |
| (dextrin, Nutriose FM10) | |
| Lecithin phosphate | 0.57 |
| Vanillin ex-lignin | 0.03 |
| | 100 |

A 1000 kg batch is prepared using recipe 2A.

The chocolate making process consists essentially of mixing, refining and conching in analogous manner to that of 1A. Conching takes place at approx. 70° C. A total cycle time of 9 hours is employed as follows:

| conche filling | 3 hours |
| --- | --- |
| dry conching | 4.5 hrs |
| finishing | 0.5 hr |
| pumping | 1 hr |
| total cycle time | 9 hrs. |

2B Dark Chocolate

|  | % weight |
| --- | --- |
| Sucrose | 29.2 |
| Cocoa butter | 11.7 |
| FCMP spray | — |
| Cocoa liquor | 43.8 |
| Dietary fibre | 8.8 |
| (Raftilose Synergy 1 as oligofructose/inulin mixture) | |
| Dietary fibre | 5.8 |
| (dextrin, Nutriose FM10) | |
| Lecithin phosphate | 0.68 |
| Vanillin ex-lignin | 0.03 |
| | 100 |

A 1000 kg batch is prepared using recipe 2B. Processing, including conching, is performed in analogous manner to that of 1B. Conching takes place at a approximately 100° C.

COMPARATIVE EXAMPLES

A 5500 kg batch is prepared for Composition 3A, a composition of the invention.

Examples 3B to 3E

A 40 kg batch is prepared for each of compositions 3B to 3E as listed in Table 1. A taste evaluation is undertaken based on the perceived combination of three parameters, namely caramel note, stickiness, and dry/sandy/grainy mouthfeel. Ranking used: 1=poorest; 7=best. The rankings are listed in Table 1. Composition 3A receives 3.8, the highest score.

Examples 4B to 4D

A 40 kg batch is prepared for each of compositions 4B, 4C, and 4D using the blends as listed in Table 2. A taste evaluation is undertaken in analogous manner to that for Examples 3B to 3E. Composition 3A receives a score of 5, the highest score.

TABLE 1

| COMPOSITION | REFERENCE Weight % | 3A 5500 kg batch wt % | COMPARATIVE EXAMPLES MILK CHOCOLATE, 40 kg batch | | | |
|---|---|---|---|---|---|---|
| | | | 3B wt % | 3C wt % | 3D wt % | 3E wt % |
| Sugar | 42 | 24 | 24 | 24 | 24 | 24 |
| Cocoa butter | 24 | 24 | 24 | 24 | 24 | 24 |
| Whole milk powder | 22.5 | 22.5 | 22.5 | 22.5 | 22.5 | 22.5 |
| Cocoa mass | 11.5 | 11.5 | 11.5 | 11.5 | 11.5 | 11.5 |
| Dietary Fibre (Inulin) | | | | | 18 | |
| Dietary Fibre (Polydextrose) | | | | | | 18 |
| Dietary fibre (oligofructose-inulin mixture) | | 9 | | 18 | | |
| Dietary fibre (Dextrin) | | 9 | 18 | | | |
| Emulsifier (soya lecithin) | + | + | + | + | + | + |
| Vanillin | + | + | + | + | + | + |
| TASTE EVALUATION: 1-7 TEST, TASTE PANEL: 6 trained persons, reference, overall score (based on 3 parameters) | | | | | | |
| Caramel note, Stickyness, Dry/sandy/grainy | | 3.8 | 3.3 | 2.3 | 3.5 | 3.2 |

"+" represents trace quantity, <1% by weight
TEST 1-7, simple difference test. 1: large difference; 7: no difference in relation to the reference.

TABLE 2

| COMPOSITION | REFERENCE Weight % | 3A 5500 kg batch wt % | COMPARATIVE EXAMPLES MILK CHOCOLATE, blends | | |
|---|---|---|---|---|---|
| | | | 4A wt % | 4B wt % | 4C wt % |
| Sugar (sucrose) | 42 | 24 | 24 | 24 | 24 |
| Cocoa butter | 24 | 24 | 24 | 24 | 24 |
| Whole milk powder | 22.5 | 22.5 | 22.5 | 22.5 | 22.5 |
| Cocoa mass | 11.5 | 11.5 | 11.5 | 11.5 | 11.5 |
| Dietary Fibre (Inulin) | | | 9 | | |
| Dietary Fibre (Polydextrose) | | | | 9 | 9 |
| Dietary fibre (oligofructose-inulin mixture) | | 9 | | | 9 |
| Dietary fibre (Dextrin) | | 9 | 9 | 9 | |
| Emulsifier (soya lecithin) | + | + | + | + | + |
| Vanillin | + | + | + | + | + |
| TASTE EVALUATION: 1-7 TEST, TASTE PANEL: 6 trained persons, overall score (based on 3 parameters) | | | | | |
| Caramel note, Stickyness, Dry/sandy/grainy | | 5 | 3.9 | 4.1 | 3.9 |
| MIX | | | | | |
| 3B | | | 50 | 50 | |
| 3C | | | | | 50 |
| 3D | | | 50 | | |
| 3E | | | | 50 | 50 |

TEST 1-7, simple difference test. 1: large difference/7: no difference - in relation to the reference The present invention provides improved confectionery, in particular chocolate, compositions with a low sugar content which are better tolerated than hitherto known reduced sugar chocolate compositions and have an acceptable rheology.

The compositions of this invention avoid an increase in fat content.

The compositions of the invention demonstrate several advantages over known compositions. Thus, the compositions of this invention
- are more easily processed on an industrial scale;
- provide an acceptable taste profile;
- present an acceptable and improved mouth-feel;
- are suitable for consumption by adults and children;
- provide a potentially lower glycaemic index;
- are well-digested, and
colonically and intestinally better tolerated.

The invention claimed is:

1. A chocolate composition consisting essentially of:

| | |
|---|---|
| sucrose: | 23 to 27 wt % |
| cocoa butter: | 22 to 25 wt % |
| full cream milk powder: | 20 to 25 wt % |
| cocoa liquor: | 9 to 13 wt % |
| inulin oligofructose mixture | 7 to 11 wt % |
| corn dextrin: | 5 to 10 wt % |
| emulsifier: | 0.3 to 0.9 wt % |
| vanillin: | 0.01 to 0.06 wt % | wherein the amounts by weight are based on the weight of the total composition and total 100%.

* * * * *